(12) United States Patent
Aoto (10) Patent No.: US 7,650,237 B2
(45) Date of Patent: Jan. 19, 2010

(54) NAVIGATION APPARATUS AND NAVIGATION METHOD

(75) Inventor: Hidekazu Aoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 547 days.

(21) Appl. No.: 11/494,277

(22) Filed: Jul. 27, 2006

(65) Prior Publication Data

US 2007/0061070 A1    Mar. 15, 2007

(30) Foreign Application Priority Data

Aug. 29, 2005    (JP) .............................. 2005-246967

(51) Int. Cl.
    *G01C 21/30* (2006.01)
(52) U.S. Cl. ...................... 701/212; 701/200; 701/207; 701/208; 701/209; 340/995.1; 340/995.14; 340/995.19; 340/995.26; 340/995.27
(58) Field of Classification Search ................. 701/209, 701/200, 207, 208
    See application file for complete search history.

(56) References Cited

U.S. PATENT DOCUMENTS

| | | | | |
|---|---|---|---|---|
| 5,796,397 A | * | 8/1998 | Kusano ...................... 715/804 |
| 5,825,306 A | * | 10/1998 | Hiyokawa et al. ........... 340/988 |
| 6,144,318 A | * | 11/2000 | Hayashi et al. ......... 340/995.19 |
| 6,144,920 A | * | 11/2000 | Mikame ...................... 701/212 |
| 6,456,929 B1 | * | 9/2002 | Ohshima ..................... 701/207 |
| 6,462,676 B1 | | 10/2002 | Koizumi |
| 6,810,326 B1 | * | 10/2004 | Kawasaki .................... 701/209 |
| 2002/0065602 A1 | * | 5/2002 | Ohshima ..................... 701/207 |
| 2003/0132862 A1 | * | 7/2003 | Kurosawa ................ 340/995.1 |
| 2003/0208316 A1 | * | 11/2003 | Endo et al. .................. 701/211 |
| 2003/0220735 A1 | * | 11/2003 | Nimura ...................... 701/208 |
| 2004/0133345 A1 | * | 7/2004 | Asahara ...................... 701/209 |
| 2005/0137788 A1 | * | 6/2005 | Kimura ...................... 701/201 |
| 2006/0020373 A1 | * | 1/2006 | Abe ............................... 701/1 |

* cited by examiner

*Primary Examiner*—Khoi Tran
*Assistant Examiner*—Jonathan Sample
(74) *Attorney, Agent, or Firm*—Brinks Hofer Gilson & Lione (57) ABSTRACT

There are provided a navigation apparatus and a navigation method capable of performing a character display reflecting the operation result of a user. The navigation apparatus includes a facility search section that searches for a facility fulfilling a set search condition; a display flag changing section that sets a character string, which is displayed at a position corresponding to the facility searched by the facility search section, as a character string indicating the facility; a map drawing section that draws a map image including the location of the facility searched by the facility search section and the character string set by the display flag changing section; and a display processing section and a display device, which display the map image drawn by the map drawing section.

18 Claims, 8 Drawing Sheets

| CODE | LEVEL | GENRE | DISPLAYED CHARACTER CONTENTS | FLAG | DISPLAY SCALE |
|---|---|---|---|---|---|
| 2xxx01 | 0 | PLACE NAME | IWAKI-SHI TAIRA | OFF | 500km |
| 2xxx02 | 1 | BUILDING | ○○ DEPARTMENT STORE | ON | 50m~200km |
| 2xxx03 | 2 | TENANT | LADIES' WEAR ○○ | OFF | 25m |
| 2xxx04 | 2 | TENANT | LADIES' WEAR △△ | OFF | 25m |
| 2xxx05 | 2 | TENANT | BOOKS ×× | OFF | 25m |
| 2xxx06 | 2 | TENANT | 100YEN SHOP | OFF | 25m |
| 2xxx07 | 2 | TENANT | △△ EYEGLASSES | OFF | 25m |

FIG.4

| CODE | LEVEL | GENRE | DISPLAYED CHARACTER CONTENTS | FLAG | DISPLAY SCALE |
|---|---|---|---|---|---|
| 2xxx01 | 0 | PLACE NAME | IWAKI-SHI TAIRA | OFF | 500km |
| 2xxx02 | 1 | BUILDING | ○○ DEPARTMENT STORE | OFF | 50m~200km |
| 2xxx03 | 2 | TENANT | LADIES' WEAR ○○ | OFF | — |
| 2xxx04 | 2 | TENANT | LADIES' WEAR △△ | OFF | — |
| 2xxx05 | 2 | TENANT | BOOKS ×× | OFF | — |
| 2xxx06 | 2 | TENANT | 100YEN SHOP | OFF | — |
| 2xxx07 | 2 | TENANT | △△ EYEGLASSES | ON | 50m~500km |

| CODE | LEVEL | GENRE | DISPLAYED CHARACTER CONTENTS | FLAG | DISPLAY SCALE |
|---|---|---|---|---|---|
| 2xxx01 | 0 | PLACE NAME | IWAKI-SHI TAIRA | OFF | 500km |
| 2xxx02 | 1 | BUILDING | ○○ DEPARTMENT STORE | ON | 50m~200km |
| 2xxx03 | 2 | TENANT | LADIES' WEAR ○○ | OFF | — |
| 2xxx04 | 2 | TENANT | LADIES' WEAR △△ | OFF | — |
| 2xxx05 | 2 | TENANT | BOOKS ×× | OFF | — |
| 2xxx06 | 2 | TENANT | 100YEN SHOP | OFF | — |
| 2xxx07 | 2 | TENANT | △△ EYEGLASSES | ON | 50m~500km |

| CODE | GENRE | DISPLAYED CHARACTER CONTENTS | NODE | DISPLAY |
|---|---|---|---|---|
| 2xxx01 | BUILDING | ×× GENERAL HOSPITAL | ON | OFF |
| 2xxx02 | PLACE NAME | 15-CHOME | ON | OFF |
| 2xxx03 | BUILDING | △△ POST OFFICE | ON | OFF |
| 2xxx05 | BUILDING | ○○ DEPARTMENT STORE | ON | ON |
| 2xxx07 | TENANT | △△ EYEGLASSES | ON | ON |

FIG. 11

| CODE | GENRE | DISPLAYED CHARACTER CONTENTS | NODE | DISPLAY |
|---|---|---|---|---|
| 2xxx01 | BUILDING | ×× GENERAL HOSPITAL | ON | ON |
| 2xxx02 | PLACE NAME | 15-CHOME | ON | ON |
| 2xxx03 | BUILDING | △△ POST OFFICE | ON | ON |
| 2xxx05 | BUILDING | ○○ DEPARTMENT STORE | ON | ON |
| 2xxx07 | TENANT | △△ EYEGLASSES | ON | ON |

FIG.12

NAVIGATION APPARATUS AND NAVIGATION METHOD

BACKGROUND OF THE INVENTION

1. Field of the Invention

The present invention relates to a navigation apparatus and a navigation method that displays character strings corresponding to the names of buildings, tenants, or the like which are included in a map image.

2. Description of the Related Art

Conventionally, there has been known a navigation apparatus that improved the difficulty of viewing an image of an overlapped display by preferentially displaying character data of higher priority in the case where character data displayed on a map image overlap one another (refer to Japanese Patent Laid-Open No. 7-301542 publication (pages 5 to 8, FIGS. 1 to 11), for example).

Although the navigation apparatus disclosed in Japanese Patent Laid-Open No. 7-301542 describes several ways of determining priority and character data is displayed according to any priority, there was a problem that the apparatus could not necessarily display characters reflecting an operation result of a user. For example, a case is considered that the user performs a facility search for a destination of route search or the like, searches for a facility fulfilling a predetermined condition, and displays a map image around the facility. Even when the facility is a tenant on the first floor of a building, only the name of the building, the address of the building location, or the like has been displayed conventionally, and the facility name has rarely been displayed. Since there are cases where a plurality of tenants occupies the same building, it is not possible to preferentially display any tenant name even if the user desires. Further, in the case where a travel route using the searched facility as a destination is set through a route search, facility names, street addresses or the like become easy to find as a landmark on the travel route if only character data around the route can be preferentially displayed. However, such display cannot be performed only by setting the priority of character data.

SUMMARY OF THE INVENTION

The present invention has been created in view of the above-described points, and it is an object of the invention to provide a navigation apparatus capable of displaying characters reflecting an operation result of a user.

To solve the above-described problems, the navigation apparatus of the present invention includes facility search means for searching for a facility that satisfies a set search condition; displayed character string setting means for setting a character string, which is displayed at a position corresponding to the facility searched by the facility search means, as a character string indicating the facility; map drawing means for drawing a map image including the location of the facility searched by the facility search means, and allowing the map image to include the character string set by the displayed character string setting means; and display means for displaying the map image drawn by the map drawing means. Thus, when the user performs a facility search, a character string indicating a searched facility can be included in the map image around the facility without fail, and a character display reflecting the operation result of the user can be performed.

Further, regarding the character string displayed at a position corresponding to the facility searched by the above-described facility search means, it is desirable that contents in response to display scale be set in a non-facility search state and the contents be changed to the character string indicating the searched facility in a facility search state. Thus, the character string indicating a searched facility can be displayed only when the user has instructed a search, and a regular map display in which the regular character string is displayed can be performed in other cases.

Further, regarding the character string displayed at a position corresponding to the facility searched by the above-described facility search means, it is desirable that contents in response to display scale be set in a non-facility search state and both the contents in response to display scale and the character string indicating the searched facility be included in a facility search state. Thus, the character string indicating a searched facility can be additionally displayed only when the user has instructed a search, and a regular map display in which the regular character string is displayed can be performed in other cases.

Further, it is desirable that the display position of at least one of the two types of character strings, which are included in the above-described facility search state, be changed. This can prevent a state where display positions are the same and overlap when they are displayed.

Further, with the above-described two types of character strings, it is desirable to highlight a character string indicating a facility searched by the facility search means. Thus, it is possible to notify the user that the character string was added to the regular display contents, that is, a character display reflecting the operation result of the user.

Further, with the above-described two types of character strings, it is desirable that the display position of the character string indicating the facility searched by the facility search means be changed in such a manner that the relationship with the location of the facility is grasped. Thus, the corresponding relationship between the added character string and the facility is made clear even if the display position of the character string is moved.

Further, it is desirable for the apparatus to further include route search means for performing a route search by setting the facility searched by the above-described facility search means as a destination. Thus, the character string indicating the facility is included in the map display around the searched facility without fail, and the user can confirm that the facility set as the destination of the route search is a facility extracted by search, and a route search using the facility that the user desired as a destination can be executed without fail.

Furthermore, in drawing a map image highlighting a travel route determined by the route search means, it is desirable that the above-described map drawing means allows the image to include character strings in which display positions corresponding to right/left turn intersections on the travel route are set. Thus, when the travel route determined by the route search is added to the map image, it is possible for the image to include the character strings near right/left turn intersections, which are landmarks in driving a vehicle along the travel route, without fail, and a character display reflecting the operation result of the user can be performed.

Still further, it is desirable that the character strings, in which display positions according to right/left turn intersections on the above-described travel route are set, are character strings to be displayed corresponding to the display scale at the point of displaying the travel route if there is any such character string, and are character strings corresponding to buildings or place names that are displayed when the display scale is changed if there is no character string to be displayed.

Thus, it is possible to display character strings, which are landmarks, at each right/left turn intersection of the travel route without fail.

DESCRIPTION OF THE PREFERRED EMBODIMENTS

Figure 1:
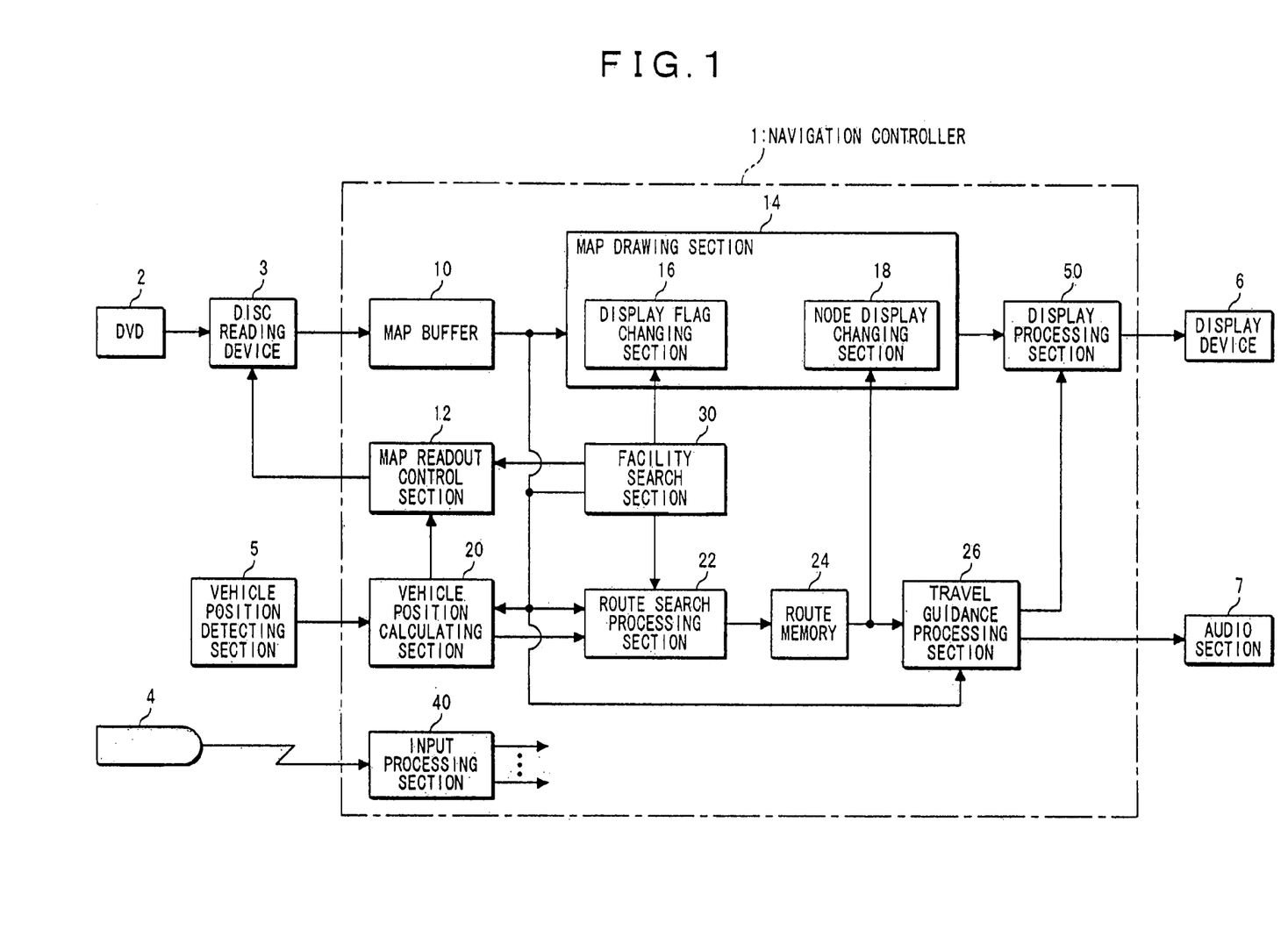
FIG. 1 is a block diagram illustrating a navigation apparatus of one embodiment.

In the following, a navigation apparatus of one embodiment to which the present invention is applied will be described with reference to the drawings. FIG. 1 is a block diagram illustrating the navigation apparatus of the embodiment. The navigation apparatus shown in FIG. 1 includes a navigation controller 1, a DVD 2, a disc reading device 3, a remote control unit 4, a vehicle position detecting section 5, a display device 6, and an audio section 7.

The navigation controller 1 controls the entire navigation apparatus. The function of the navigation controller 1 is realized by executing a predetermined program using a CPU, a ROM, a RAM or the like.

The DVD 2 is an information storage medium that stores map data that is necessary in performing various navigation actions. The map data includes map image data necessary in map display and road data necessary for route search. Further, the map data also includes data necessary in searching for a facility (such as a tenant name) whose name or the like was specified. Map data using a rectangular drawing sheet, which is sectioned in a proper size by longitude and latitude, as a unit is stored in the DVD 2. The map data of each drawing sheet can be identified and read out by specifying a drawing sheet number.

The disc reading device 3 is capable of loading one or a plurality of DVDs 2, and reads out the map data from any DVD 2 under the control of the navigation controller 1. Note that the discs to be loaded may not necessarily be DVDs but may be CDs. Alternatively, the device may be capable of selectively loading both a DVD and a CD.

The remote control unit 4 includes a joy stick that specifies a direction such as up, down, right, left or the like and various operation keys such as a numerical keypad and an "Enter" key for fixing various settings, and sends signals in response to operation contents to the navigation controller 1. In this embodiment, an operation for specifying a tenant name or the like in a facility search is performed by using the remote controller 4.

The vehicle position detecting section 5 includes a GPS receiver, a direction sensor, a distance sensor or the like, for detecting a vehicle position (longitude, latitude) at predetermined timing, and sends detection data to the navigation controller 1.

The display device 6 displays various images such as a map image around the position of the user's vehicle and a search result of facilities around the vehicle. The audio section 7 produces voice guidance or the like, which is created based on audio signals received from the navigation controller 1, in the vehicle.

Further, as shown in FIG. 1, the navigation controller 1 includes a map buffer 10, a map readout control section 12, a map drawing section 14, a vehicle position calculating section 20, a route search processing section 22, a route memory 24, a travel guidance processing section 26, a facility search section 30, an input processing section 40 and a display processing section 50.

The map buffer 10 temporarily stores map data read out from the DVD 2 by the disc reading device 3. The map readout control section 12 sends a readout request for a predetermined range of map data to the disc reading device 3 in response to a vehicle position calculated by the vehicle position calculating section 20 or an instruction from the input processing section 40. Further, the map data to be read out includes data necessary for a facility search and data necessary for a route search in addition to data necessary for drawing a map image. The map drawing section 14 performs the necessary drawing process to display a map image based on the map data stored in the map buffer 10 and creates map image drawing data. The map drawing section 14 includes a display flag changing section 16 and a node display changing section 18. The display flag changing section 16 switches ON/OFF the display flag that is set for each of a plurality of character strings corresponding to one display position. These character strings are prepared corresponding to display scales or the like, and character strings whose flags are turned ON are used in the actual display. The node display changing section 18 changes the display state of character strings whose display positions are set near the right/left turn intersections on the travel route, which was determined by a route search, by each node corresponding to the intersections.

The vehicle position calculating section 20 calculates the position of the user's vehicle based on detection data received from the vehicle position detecting section 5, and performs a matching process for correcting the position of the user's vehicle based on a road shape and a travel path on the map if the calculated position of the vehicle is not on a road of the map.

The route search processing section 22 searches for a travel route connecting a departure point and a destination according to a predetermined search condition. The route memory 24 stores route data corresponding to the travel route extracted by the route search processing section 22. For example, data specifying right/left turn intersection nodes on the travel route (such as a node number) are stored as the route data. The travel guidance processing section 26 creates travel route drawing data to display the travel route, which was obtained by the search process of the route search processing section 22, on the map in a superimposed manner, and creates audio signals such as intersection guidance necessary for guiding a vehicle along the travel route.

When the user specifies a search condition such as a facility name, genre or a telephone number, the facility search section 30 searches for a corresponding facility. When a plurality of facilities is extracted by the search, second and further searches can be performed by narrowing the search condition, until one facility is finally determined. The determined facility is used for displaying a map image around the facility, or setting the facility as the destination in a route search.

The input processing section 40 sends a command for performing actions corresponding to various types of operation instruction, which is received from the remote control unit 4, to each section in the navigation controller 1. Map image drawing data created by the map drawing section 14 is sent to the display processing section 50, and this section displays the map image of a predetermined range on the screen of the display device 6 based on the drawing data. Further, when travel route drawing data for highlighting, which is created by the travel guidance processing section 26, is sent to the display processing section 50, this section displays the map image by superimposing the drawing data on the screen of the display device 6.

The above-described facility search section 30, display flag changing section 16, the map drawing section 14, the display processing section 50 and display device 6, and the route search processing section 22 respectively correspond to the facility search means, the displayed character string setting means, the map drawing means, the display means, and the route search means.

Next, the process of displaying a map image around the facility extracted by a facility search and performing route guidance by setting the searched facility as a destination will be described.

Display Process Associated with Facility Search

Figure 2:
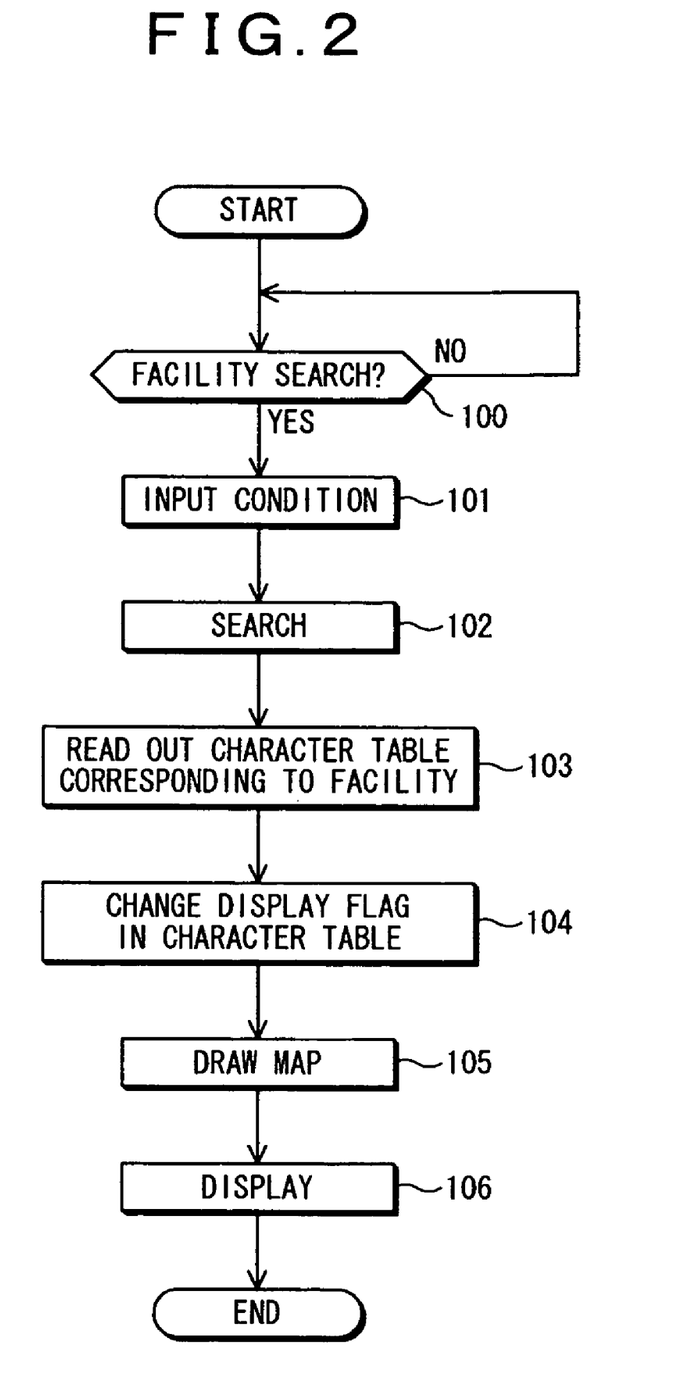
FIG. 2 is a flowchart of a process to display a map image around a facility extracted by a facility search.

FIG. 2 is a flowchart of a process to display a map image around a facility extracted by a facility search. The facility search section 30 judges whether or not a user has instructed a facility search (step 100), and repeats this step if no search instruction is made. When the user has instructed a facility search, an affirmative judgment is made in step 100. Next, when the user enters a search condition (step 101), the facility search section 30 extracts one facility fulfilling the search condition (step 102). If one facility cannot be extracted by using one search condition, a plurality of search conditions is used until one facility that the user desires is finally extracted.

Next, the display flag changing section 16 in the map drawing section 14 reads out a character table corresponding to the facility extracted by the search (step 103), and changes the contents of the display flag in the character table (step 104).

Figure 3:
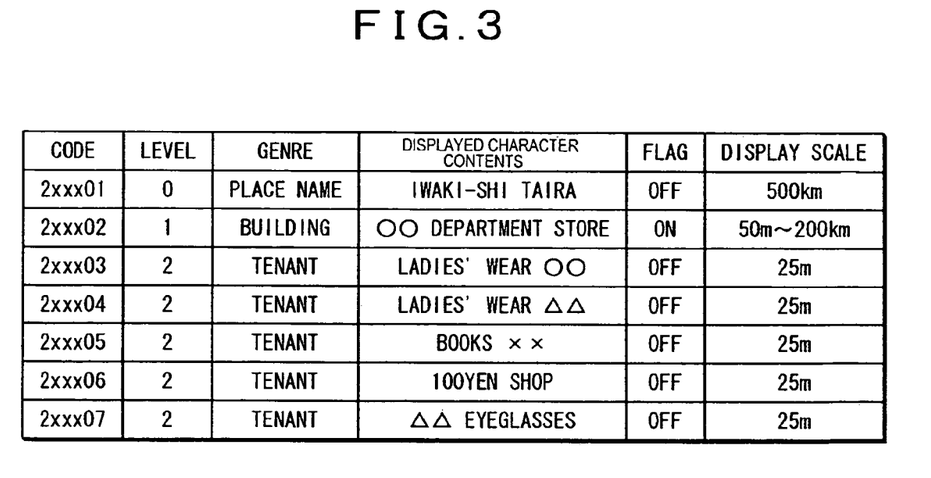
FIG. 3 is a specific example of a character table corresponding to one facility extracted by a search.

FIG. 3 is a specific example of a character table corresponding to a facility extracted by a search. The character table indicates types of character strings (genre, displayed character contents) that are displayed near searched facilities, and the table is read out from the DVD 2 and included in the map data stored in the map buffer 10. In FIG. 3, "Level" corresponds to the display scale in which smaller display scales (wide area display) correspond to smaller level values. Note that the "Display Scale" shown in FIG. 3 indicates an actual distance corresponding to a unit length on a display screen, and actual display scales are indicated by the reciprocal of the distances. Further, "Displayed Character Contents" indicates a character string that is selectively displayed, and "Genre" indicates a genre corresponding to each character string. Furthermore, "Flag" is a display flag indicating the display state of a character string denoted by the "Displayed Character Contents", where ON and OFF respectively show a display state and a non-display state. In a regular map display (map display around the user's vehicle, for example) other than the map display of an area around a searched facility, one display flag corresponding to the display scale is set to ON, and it is displayed around the location of the searched facility. In the example shown in FIG. 3, the current display scale is set to 100 m, and the display flag corresponding to level "1" is set to ON, for example.

Figure 4:
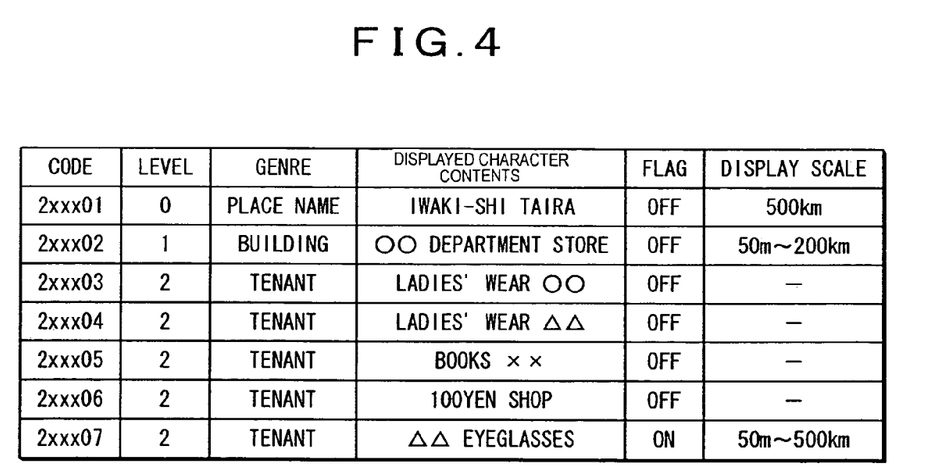
FIG. 4 is a specific example of a character table after the contents of display flags are changed.

FIG. 4 is a specific example of a character table after the display flags are changed. It is assumed that "ΔΔ eyeglasses" tenanting in "∘∘ department store" located in Taira of Iwaki city was extracted by a facility search. In such a case, the display flag corresponding to the searched facility, that is, "ΔΔ eyeglasses" is changed to ON, and the display flag corresponding to "∘∘ department store", which had been a subject to be displayed, is changed to OFF. As described, display flags that were changed according to the result of a facility search regardless of the display scale become effective for all scales (50 m to 500 km).

Next, in FIG. 2, the map drawing section 14 refers to the changed character table and draws a map image around the searched facility (step 105). In this drawing process, the map drawing section 14 uses the displayed character contents "ΔΔ eyeglasses" whose display flag is ON in the character table and draws a character string that becomes a subject to be displayed. The display processing section 50 displays the map image around the searched facility on the display device 6 by using map image drawing data created by the map drawing section 14 (step 106).

Figure 5:
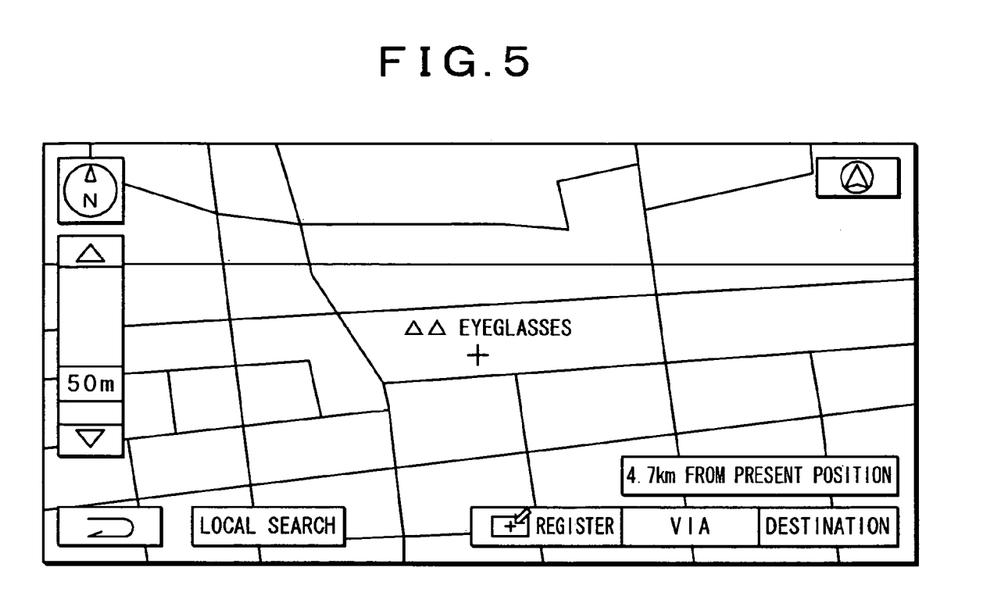
FIG. 5 is a specific example of map image display around a searched facility.
Figure 6:
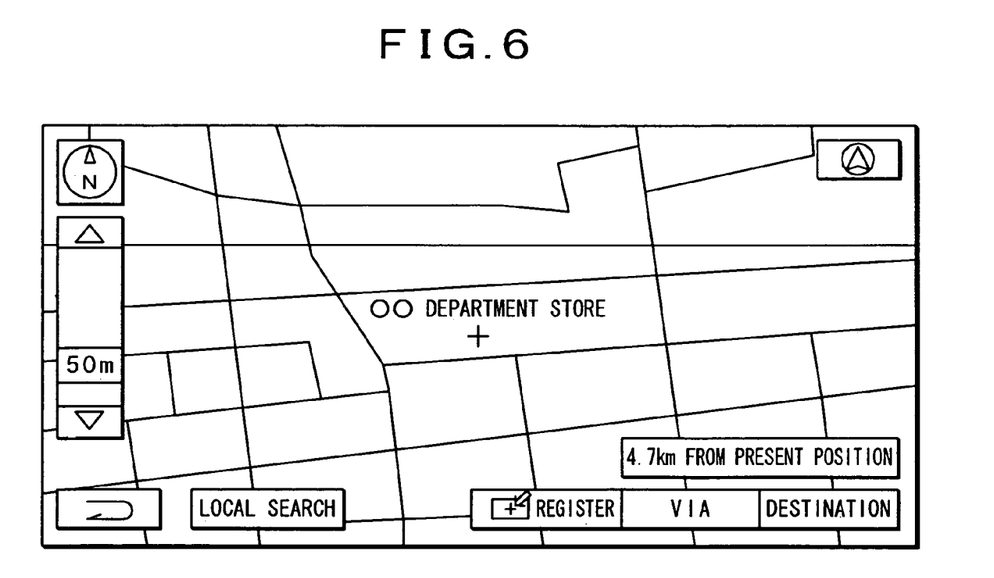
FIG. 6 is an example of a conventional display.

FIG. 5 is a specific example of a map image display around a searched facility. A map image where the location of the searched facility is set at the center of a screen is drawn, and the character string contents "ΔΔ eyeglasses" is displayed at a predetermined position near the location. In the case where one facility is extracted as a search result and the map image around the facility is displayed, the image of an icon corresponding to the facility, detailed information about the facility, or the like can be displayed in the same screen, but such display is omitted in the example shown in FIG. 5 in order to explain only the character string near the location of the facility. FIG. 6 depicts a conventional display example for comparison. As shown in FIG. 6, when the display scale is set to "50 m", the map image around the searched facility conventionally includes the displayed character contents "∘∘ department store" whose display flag is set to ON corresponding to the display scale.

As described, in displaying the map image around the searched facility when the user performs a facility search, the character string indicating the facility can be included in the image without fail, and a character display reflecting the operation result of the user can be performed. Particularly, a character string indicating a searched facility can be displayed when the user has instructed a search, and the regular map display where a regular character string is displayed can be performed in other cases.

Figure 7:
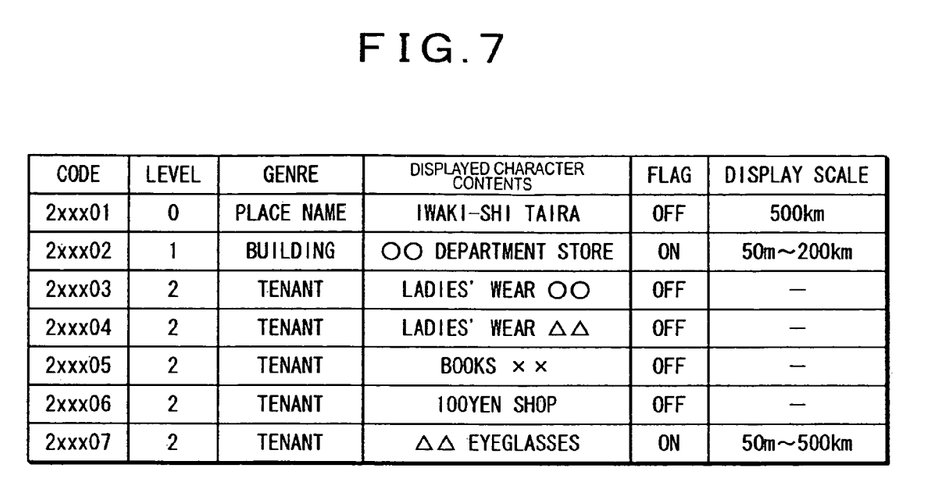
FIG. 7 illustrates the contents of a character table when two character strings are displayed.

In the above-described explanation, the character string corresponding to the facility was displayed instead of the regular character string displayed in response to the display scale in displaying the map image around the searched facility, but both of the character strings may be displayed. FIG. 7 illustrates the contents of a character table when two character strings are displayed. As shown in FIG. 7, when the display flag of the displayed character contents "∘∘ department store" is ON in response to the display scale, the display flag corresponding to the searched facility "ΔΔ eyeglasses" is changed to ON while the setting of the display flag of the department store is maintained.

Figure 8:
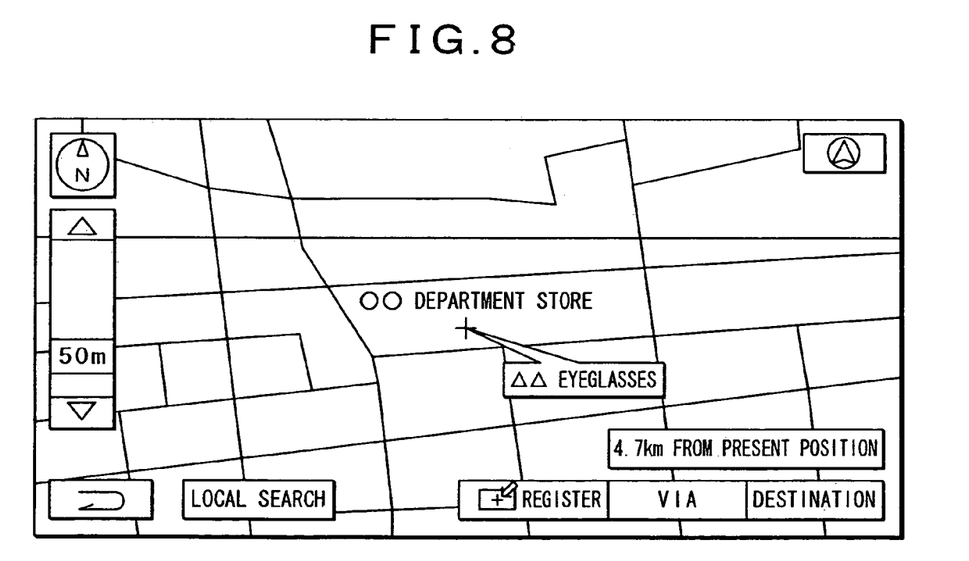
FIG. 8 is a display example of a map image around a searched facility corresponding to the character table shown in FIG. 7.

FIG. 8 is a display example of a map image around a searched facility corresponding to the character table shown in FIG. 7. Since the same display position is originally set for each displayed character contents included in the character table shown in FIG. 7 or the like, two character strings would overlap if they were displayed without change. So, the map drawing section 14 displays one at a display position that was originally set ("○○ department store" in FIG. 8) and displays the other one at a shifted display position ("ΔΔ eyeglasses" in FIG. 8). This can prevent a state where display positions are originally the same and overlap if they were displayed without change.

Particularly, it is desirable to highlight the character string indicating the searched facility out of the above-described two types of character strings. In the display example shown on FIG. 8, the character string "ΔΔ eyeglasses" is highlighted by enclosing it in a rectangular frame, but it may be highlighted by another method such as by changing color. Thus, it is possible to notify the user that the character string was added to the regular display contents, that is, a character display reflecting the operation result of the user was performed. Further, in the case where the display position of the character string indicating the searched facility is changed, it is desirable to change the position in such a manner that the relationship with the location of the facility is grasped. In the display example of FIG. 8, an auxiliary line associating a cross mark indicating the location with the rectangular frame enclosing the character string "ΔΔ eyeglasses" is added so their relationship can be grasped. Thus, the corresponding relationship between the added character string and the facility is made clear even when the display position of the character string is shifted.

Display Process Associated with Route Guidance

Figure 9:
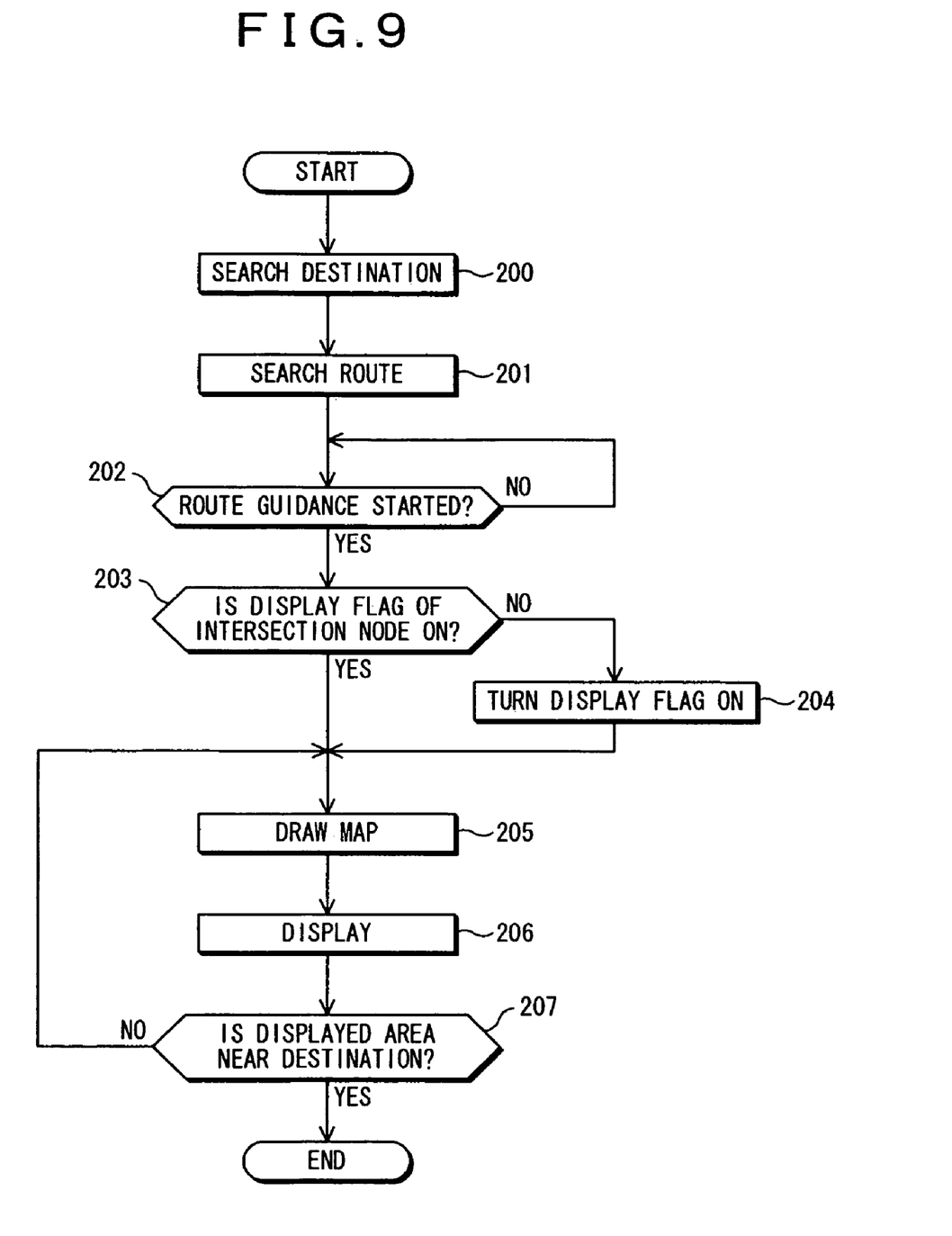
FIG. 9 is a flowchart of a display process when performing route guidance by setting the searched facility as a destination.

FIG. 9 is a flowchart showing a display process when performing route guidance by setting the searched facility as a destination. After one facility is searched and set as a destination following the process shown in FIG. 2, (step 200), the route search processing section 22 determines a travel route to the destination by a route search process (step 201). For example, by clicking the "Destination" button on the lower right of the screen while the map image around the searched facility indicated on FIG. 5 is being displayed, the searched facility can be set as the destination of the route search. The route memory 24 stores information that specifies intersection nodes corresponding to right/left turn intersections that are arranged in order along the determined travel route.

Next, the travel guidance processing section 26 judges whether or not the route guidance process has started (step 202) and, if not, repeats this step until the route guidance process starts. When the user instructs the start of route guidance, an affirmative determination is made in step 202. Then, the node display changing section 18 in the map drawing section 14 judges whether or not the display flag corresponding to each intersection node, which is stored in the route memory 24, is set to ON (step 203), and, if not, changes the display flag to ON (step 204).

Figure 10:
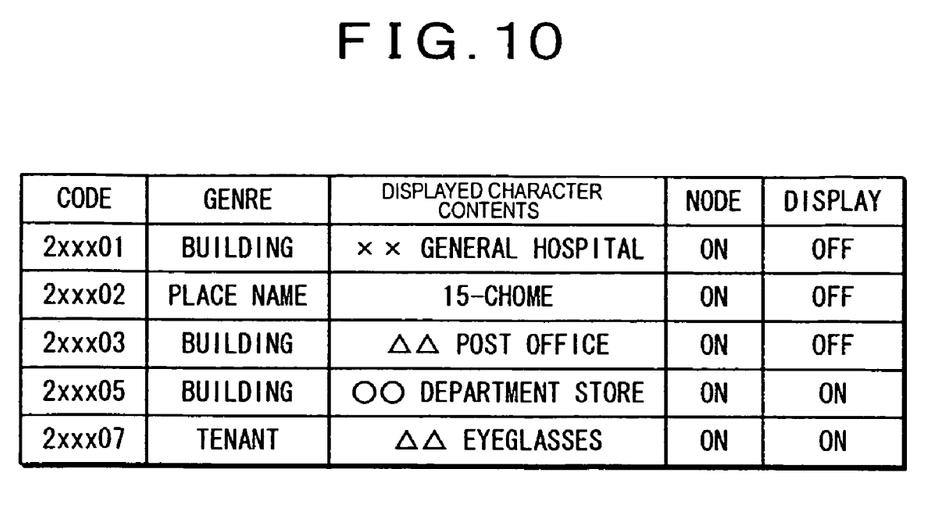
FIG. 10 is a specific example of a node table that shows the setting state of a display flag at each intersection node at the start of route guidance.

FIG. 10 is a specific example of a node table that shows the setting state of a display flag of each intersection node at the start of route guidance. The node table includes displayed character contents, a genre and the contents of the display flag near each intersection node corresponding to the display scale. The displayed character contents "○○ department store" and "ΔΔ eyeglasses" included in the lower two rows of the node table shown in FIG. 10 correspond to the searched facilities, and their display flags are set to ON in the initial state. Further, it is assumed that the display flags of intersection nodes other than the searched facilities are set to OFF in the display scale. Note that displayed character contents corresponding to a building or a place name is set for each of the other intersection nodes in response to the display scale.

Figure 11:
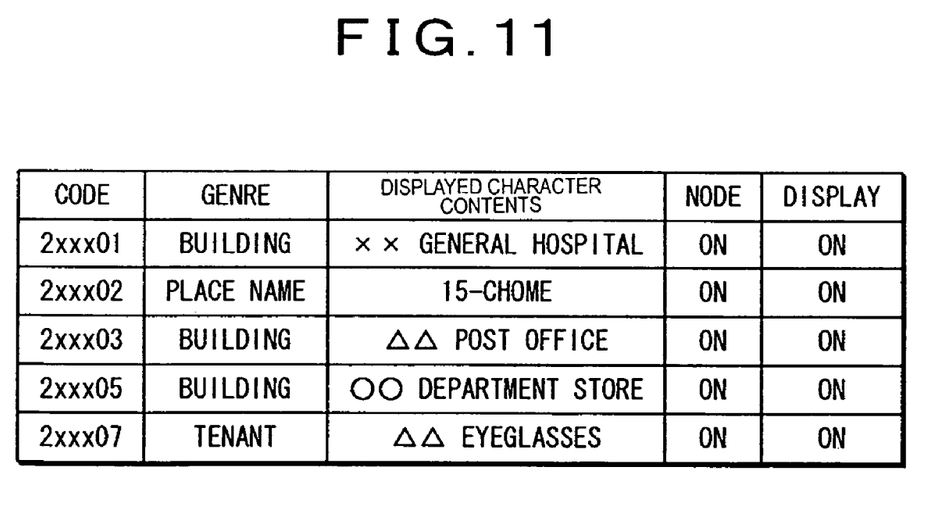
FIG. 11 is a specific example of a node table where the display flags are changed to ON in a node display changing section.

FIG. 11 is a specific example of a node table where the display flags are changed to ON in the node display changing section 18. As shown in FIG. 11, all display flags for the intersection nodes of right/left turn intersections, which exist along the travel route determined by the route search, are changed to ON.

Returning to FIG. 9, after the display flags are changed to ON or in the case where the display flags of all intersection nodes were originally set to ON corresponding to the display scale, the map drawing section 14 draws a map image after an affirmative determination is made in step 203 (step 205). In the drawing process, the contents of a character string, which is displayed near each intersection node along the travel route included in the drawing range, is determined by using the node table shown in FIG. 11. The display processing section 50 displays the map image around the searched facility on the display device 6 by using the map image drawing data created by the map drawing section 14 (step 206).

Figure 12:
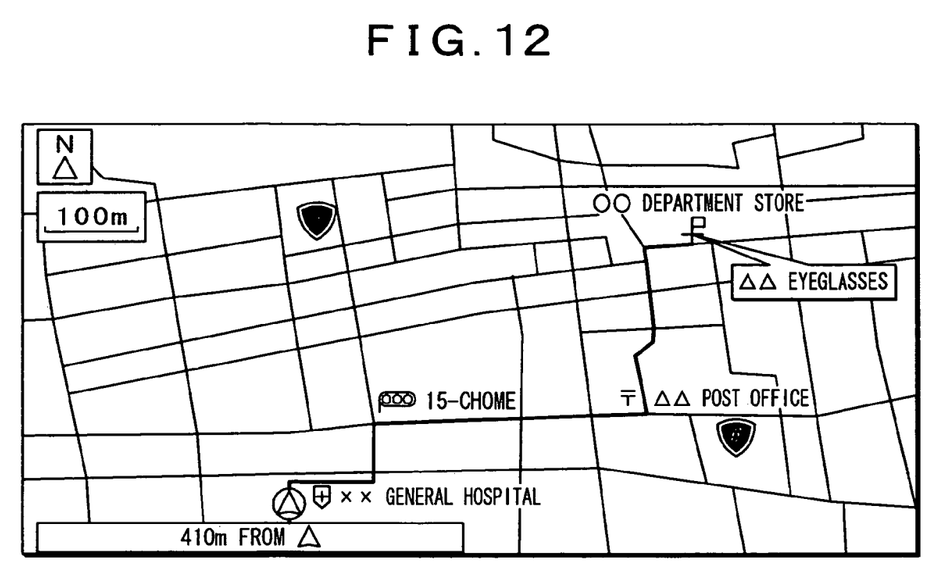
FIG. 12 is a specific example of a map image display including a travel route.

FIG. 12 is a specific example of a map image display including a travel route. In the display example shown in FIG. 12, the entire highlighted travel route from the position of the user's vehicle to the destination "ΔΔ eyeglasses" is included in one display screen, and character strings indicating a location and buildings are displayed near all right/left turn intersections along the travel route. Note that the display example shown in FIG. 12 displays only the character strings along the travel route, and other character strings included in the display region are set to a non-display state. For the setting of the non-display state, each display flag in the character table (FIG. 3) included in the display region should be changed to OFF.

The travel guidance processing section 26 judges whether or not a vehicle has arrived near a destination (step 207). If the vehicle has not arrived, a negative determination is made, and the map drawing process in step 205 and the display process in step 206 are repeated. An affirmative determination is made in step 207 when the vehicle arrives near the destination, and route guidance ends.

As described, when the travel route determined by the route search is added to the map image, character strings near the right/left turn intersections, which are landmarks in driving a vehicle along the travel route, can be included in the image without fail, and a character display reflecting the operation result of the user can be performed.

Note that the present invention is not limited to the above-described embodiment. In the above-described embodiment, the character string indicating the name of a searched facility is displayed in the map display of an area around the facility. However, in the case where such a display already was performed once, the contents of the character table corresponding to the display state are held, and the name of the facility may be displayed regardless of a facility search in displaying the map image around the facility next time.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation apparatus, comprising:
a storage medium storing, for at least one display position on a map image, a plurality of different character strings associated with a plurality of display scales;
facility search means for searching for a facility that fulfills a set search condition, where the facility searched by said facility search means is one of a plurality of facilities located in a building or place at one of said at least one display position, and one of said character strings indicates the searched facility while another of said character strings indicates the building or place at the display position;
displayed character string setting means for setting a character string which is displayed at said one display position, where in a non-facility search state the character string set for display is responsive to display scale, and in a facility search state the character string set for display is the character string indicating the searched facility regardless of display scale;
map drawing means for drawing a map image including the location of the facility searched by said facility search means and the character string set by said displayed character string setting means; and
display means for displaying the map image drawn by said map drawing means.

2. The navigation apparatus according to claim 1, further comprising:
route search means for performing a route search by setting the facility searched by said facility search means as a destination.

3. The navigation apparatus according to claim 2, wherein regarding the character string displayed at said one display position corresponding to the facility searched by said facility search means, contents responsive to display scale are set in a non-facility search state and the contents are changed to the character string indicating the searched facility in a facility search state.

4. The navigation apparatus according to claim 2, wherein regarding the character string displayed at said one display position corresponding to the facility searched by said facility search means, contents responsive to display scale are set in a non-facility search state and both the contents responsive to said display scale and the character string indicating the searched facility are included in a facility search state.

5. The navigation apparatus according to claim 4, wherein the display position of at least one of the two types of character strings included in said facility search state is changed so as not to overlap.

6. The navigation apparatus according to claim 5, wherein if said two types of character strings are displayed, a character string indicating a facility searched by said facility search means is highlighted.

7. The navigation apparatus according to claim 5, wherein if said two types of character strings are displayed, the display position of the character string indicating the facility searched by said facility search means is changed so as to indicate its relationship with the location of the facility.

8. The navigation apparatus according to claim 7, wherein said map drawing means, in drawing a map image highlighting a travel route determined by said route search means, includes in the image character strings corresponding to right/left turn intersections on said travel route.

9. The navigation apparatus according to claim 8, wherein the character strings corresponding to right/left turn intersections on said travel route are character strings to be displayed corresponding to the display scale when displaying said travel route if there is any such character string, and are character strings corresponding to buildings or place names that are displayed when the display scale is changed in the case of no character string to be displayed.

10. A navigation method, comprising:
storing, for at least one display position on a map image, a plurality of different character strings associated with a plurality of display scales;
searching for a facility that fulfills a set search condition, where the searched facility is one of a plurality of facilities located in a building or place at one of said at least one display position, and one of said character strings indicates the searched facility while another of said character strings indicates the building or place at the display position;
setting a character string which is displayed at said one display position, where in a non-facility search state the character string set for display is responsive to display scale, and in a facility search state the character string set for display is the character string indicating the searched facility regardless of display scale;
drawing a map image including the location of the searched facility and the character string; and
displaying the drawn map image.

11. The navigation method according to claim 10, further comprising:
performing a route search by setting the searched facility as a destination.

12. The navigation method according to claim 11, wherein regarding the character string displayed at said one display position corresponding to the searched facility, contents responsive to display scale are set in a non-facility search state and the contents are changed to the character string indicating the searched facility in a facility search state.

13. The navigation method according to claim 11, wherein regarding the character string displayed at said one display position corresponding to the searched facility, contents responsive to display scale are set in a non-facility search state and both the contents responsive to said display scale and the character string indicating the searched facility are included in a facility search state.

14. The navigation method according to claim 13, wherein the display position of at least one of the two types of character strings included in said facility search state is changed so as not to overlap.

15. The navigation method according to claim 14, wherein if said two types of character strings are displayed, a character string indicating the searched facility is highlighted.

16. The navigation method according to claim 14, wherein if said two types of character strings are displayed, the display position of the character string indicating the searched facility is changed so as to indicate its relationship with the location of the facility.

17. The navigation method according to claim 16, wherein in drawing a map image highlighting the determined travel route, the image includes character strings corresponding to right/left turn intersections on said travel route.

18. The navigation method according to claim 17, wherein the character strings corresponding to right/left turn intersections on said travel route are character strings to be displayed corresponding to the display scale when displaying said travel route if there is any such character string, and are character strings corresponding to buildings or place names that are displayed when the display scale is changed in the case of no character string to be displayed.

* * * * *

UNITED STATES PATENT AND TRADEMARK OFFICE
CERTIFICATE OF CORRECTION

| | |
|---|---|
| PATENT NO. | : 7,650,237 B2 |
| APPLICATION NO. | : 11/494277 |
| DATED | : January 19, 2010 |
| INVENTOR(S) | : Hidekazu Aoto |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 723 days.

Signed and Sealed this

Twenty-third Day of November, 2010

David J. Kappos
*Director of the United States Patent and Trademark Office*